United States Patent [19]

Meyn

[11] 3,958,302
[45] May 25, 1976

[54] APPARATUS FOR OPENING THE BODY CAVITY OF A FOWL

[76] Inventor: Pieter Meyn, Noordeinde 72, Oostzaan, Netherlands

[22] Filed: June 28, 1974

[21] Appl. No.: 484,466

[30] Foreign Application Priority Data
Nov. 9, 1973 Netherlands .................. 7315347

[52] U.S. Cl. .................................. 17/11
[51] Int. Cl.² ........................... A22C 21/00
[58] Field of Search .......... 17/11, 11.3, 24, 52

[56] References Cited
UNITED STATES PATENTS

| | | | |
|---|---|---|---|
| 3,417,424 | 12/1968 | Chamberlain | 17/11 |
| 3,518,718 | 7/1970 | Barefield | 17/11 |
| 3,653,093 | 4/1972 | Scheier | 17/11 |
| 3,744,087 | 7/1973 | Vertegaal | 17/11 |
| 3,750,231 | 8/1973 | Schreuder | 17/11 |
| 3,806,988 | 4/1974 | Harben, Jr. | 17/11 |

Primary Examiner—Richard C. Pinkham
Assistant Examiner—Harry G. Strappello
Attorney, Agent, or Firm—Haseltine, Lake & Waters

[57] ABSTRACT

A revolving apparatus for automatically opening a fowl's body cavity by severing the fowl's skin near its vent, comprising at least one slide block reciprocating towards and away from the fowl and carrying a gripping member, which grips the fowl as the slide block is moved towards the fowl and brings the fowl into the right position for its skin to be cut near its vent by a rotating circular knife. The knife may either be contained within a housing carried by the slide block, in which case the gripping member is formed by a ball shaped protrusion attached to the housing and adapted to penetrate into an opening formed in the fowl by cutting out its vent, or be stationary with respect to the slide block, in which case the gripping member is formed by a suction member which pulls the fowl's skin against the knife as the slide block again moves away from the fowl.

2 Claims, 4 Drawing Figures

APPARATUS FOR OPENING THE BODY CAVITY OF A FOWL

BACKGROUND OF THE INVENTION

The invention relates to an apparatus for opening the body cavity of a fowl, which is depending by the ankle joints from a hook of a conveyor.

Before a fowl can be drawn, the body cavity has to be opened by severing the fowl's skin near its vent. This has to be done with the greatest care in order to prevent damage to the fowl's entrails. For this reason the fowl's skin is always cut by hand, which of course has the disadvantage of taking much time and involving high costs.

BRIEF SUMMARY OF THE INVENTION

The invention has as its main object to remove said disadvantage and to provide an apparatus for automatically opening the fowl's body cavity.

According to the invention this object is obtained by means of at least one cutting means and at least one positioning means cooperating with the cutting means, said positioning means being attached to a slide block reciprocably mounted on a movable guide means, moving in synchronisation with said conveyor, and said slide block being moved towards and away from the fowl in such manner that the fowl is gripped by the positioning means and brought into the right position for the skin of the fowl to be cut by the cutting means near the fowl's vent, so that the body cavity is opened without damaging the fowl's entrails.

In a first preferred embodiment the cutting means comprises a rotating, pneumatically driven, circular knife, which is contained within a housing attached to the slide block and carrying the positioning means, said housing only partially exposing the knife so that only a cut of limited length and depth can be made in the fowl's skin.

In case the fowl's vent is cut out before the body cavity is opened, the positioning means preferably comprises a ball shaped protrusion which fits into an opening made in the fowl by cutting out its vent.

Advantageously the knife is intermittently driven through a control means, in such manner that the knife is only rotated when the fowl is in the desired position.

In order to stabilize the fowl during the cutting operation the positioning means preferably cooperates with a counter pressure means, which contacts the fowl's breast as the slide block moves towards the fowl. This counter pressure means may comprise a rotating disk, which is driven synchronously with the conveyor.

In a second embodiment the positioning means comprises a suction member, which at the end of the down stroke of the slide block grips the fowl's skin near its vent and during the up stroke of the slide block pulls the skin of the fowl against the cutting means, said cutting means being attached to the guide means and comprising a rotating, pneumatically driven, circular knife.

Preferably a control means is provided, which connects the suction member with a vacuum source synchronously with the movements of the slide block.

In order to stabilize the fowl during the cutting operation the apparatus according to the second embodiment is provided with a first pressure member carried by the guide means, and adapted to abut on the hook of the conveyor and with a second pressure member adapted to abut on the fowl, these members cooperating in such manner that the fowl is held in the desired position while its body cavity is opened.

A very important feature of both embodiments of the apparatus according to the invention is a revolving cone having a number of slide blocks regularly spaced about its circumference, each slide block cooperating with a cutting means and a positioning means and the spacing of the slide blocks being equal to the spacing of the hooks of the conveyor.

Preferably the revolving cone is rotatably mounted on a hollow central shaft, containing a vacuum chamber and/or a pressure chamber and carrying a control means for controlling the cutting means, or the positioning means, respectively said control means comprising a sleeve rotatably mounted on the hollow shaft, said sleeve being attached to the cone and provided with a number of openings, which are connected with the cutting means or with the positioning means, respectively, by means of flexible lines and are subsequently brought into alignment with the outlet port of the vacuum chamber and/or the pressure chamber.

Each slide block may carry a cam follower cooperating with a stationary cam rail of such shape, that the slide block is moved along its guide means in the desired manner, as the cone rotates.

BRIEF DESCRIPTION OF THE DRAWINGS

Further features and advantages of the invention will become apparent from the following description of two embodiments of the invention taken in connection with the accompanying drawings, in which.

DETAILED DESCRIPTION OF THE PREFERRED EMBODIMENT

Figure 1:
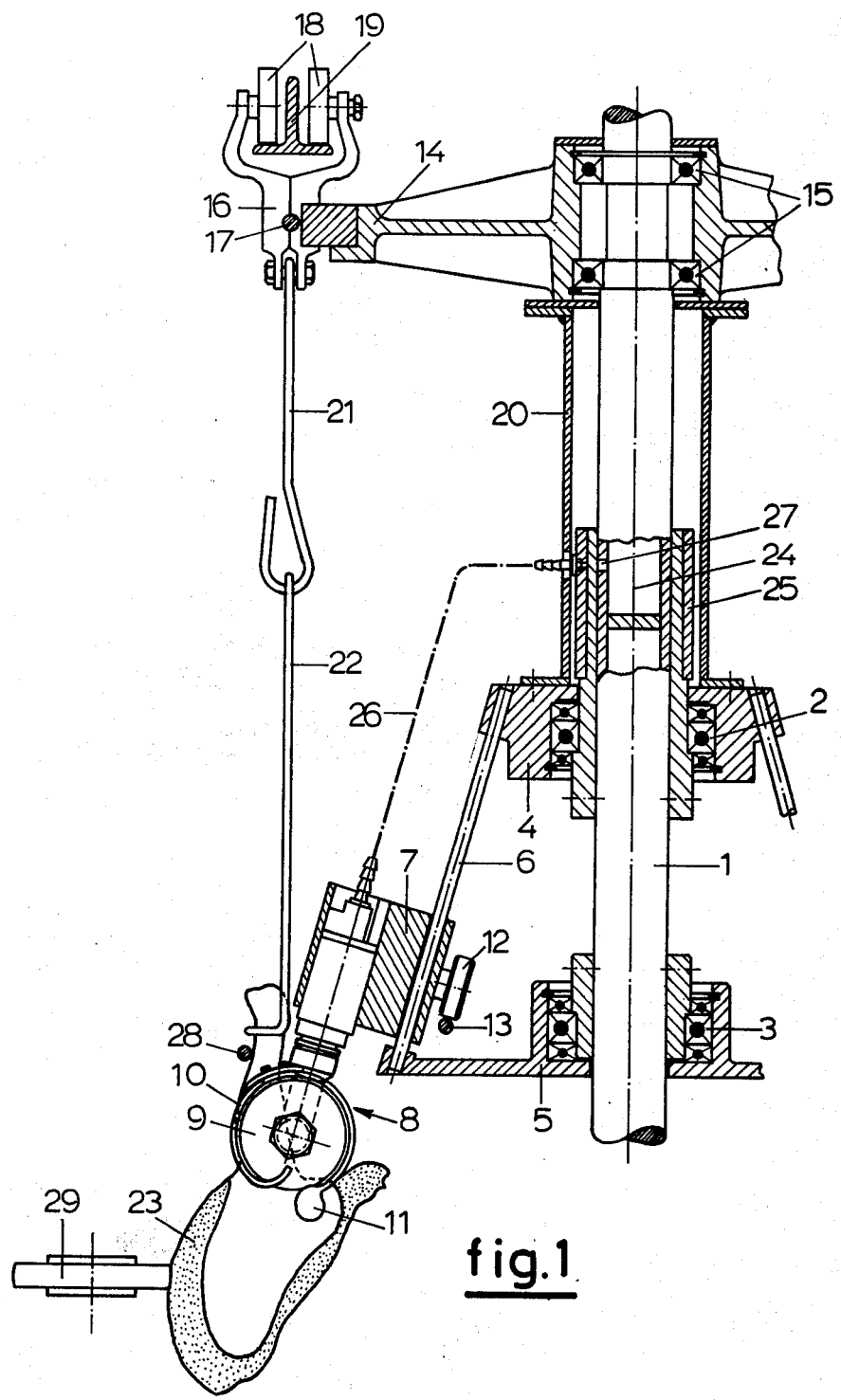
FIG. 1 is an axial cross section of an apparatus according to the invention.
Figures 2, 3:
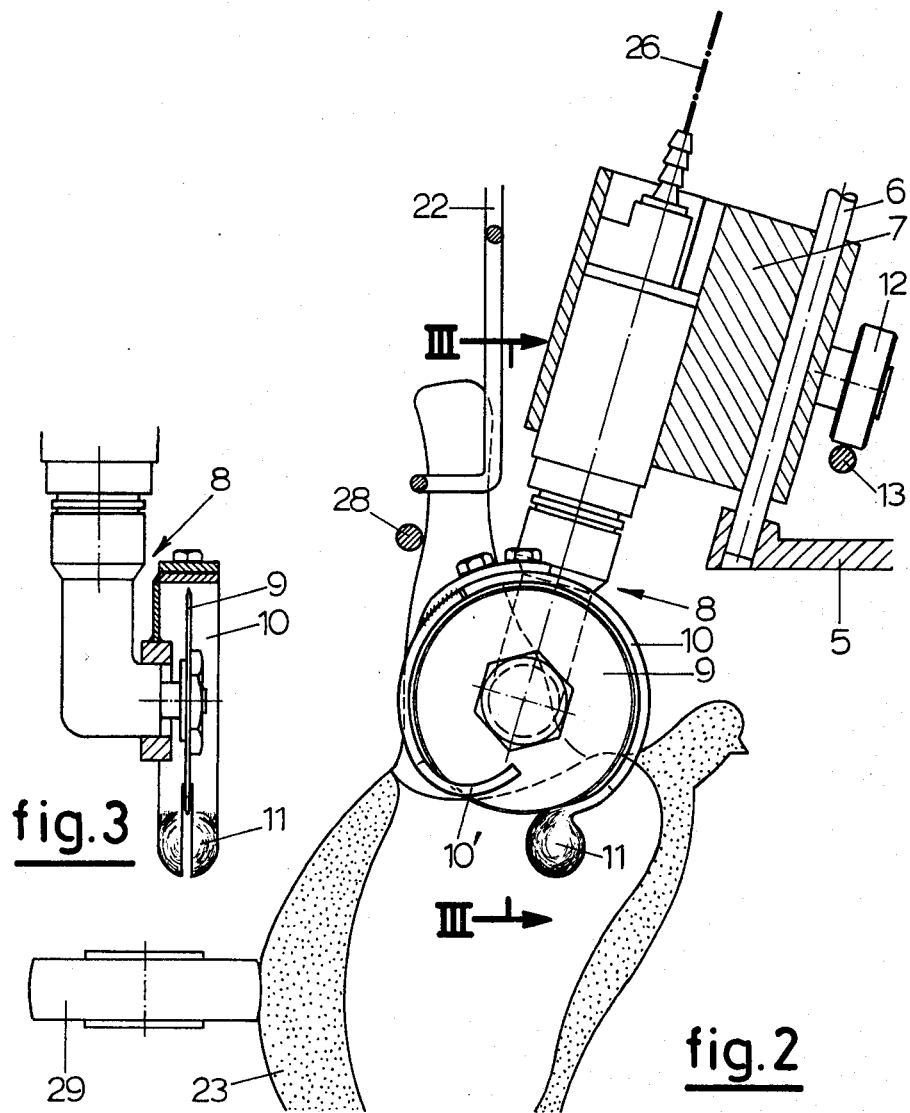
FIG. 2 is an enlarged side view of the cutting means of the apparatus shown in FIG. 1.
FIG. 3 is an enlarged front view of the cutting means, partially in cross section along the line III—III in FIG. 2.

The apparatus shown in the FIGS. 1 to 3 is a revolving apparatus for automatically opening the body cavity of a fowl and comprising a hollow central shaft 1 on which, by means of bearings 2 and 3, two radially extending vertically spaced supports 4 and 5 are rotatably mounted. Between the supports are provided a number of guide means 6, regularly spaced about the circumference of the supports. As the supports have different diameters the guide means 6 and the supports 4 and 5 form an truncated cone, concentric with the shaft 1. A slide block 7 is reciprocably mounted on each guide means 6, which comprises two parallel guide bars.

Each of the slide blocks 7 carries a cutting means 8, comprising a pneumatically driven, rotating circular knife 9, which is contained within a correspondingly shaped housing 10, which has an opening in its lower end exposing a small part of the knife 9. The housing also carries a positioning means 11. The housing 10 is formed by an annular wall, one end 10' of which is bent radially inward, whereas the other end is attached to the positioning means 11. Both ends of the wall are provided with a circumferentally directed slot into which the knife's edge is received. Each slide block 7 further carries a cam follower 12 cooperating with a fixed rail 13, shaped in such manner, that the slide block 7 is moved up and down the corresponding guide means 6 as the guide means revolves around the shaft 1.

A driving wheel 14 is rotatably mounted on the upper end of the shaft 1 by means of bearings 15. The outer edge of the wheel 14 has a number of notches for receiving the hangers 16 of a conveyor. The hangers 16 are attached to a pulling cable 17 and are supported by a fixed rail 19 by means of rollers 18. Thus the driving wheel 14 is pulled along with the hangers 16 and the cable 17, so that the supports 4 and 5, being connected with the driving wheel 14 by means of a sleeve 20, are rotated around the shaft 1 in synchronisation with the conveyor. Each hanger is provided with a hanger rod 21 carrying a hook 22 at its lower end. The notches of the driving wheel 14 are positioned in such manner that the center lines of the hook 22, the guide means 6 and the shaft 1 always lie in a common vertical plane, the corresponding knife 9 also lying in the same plane.

A fowl 23 of which the body cavity is to be opened is hung by the ankle joints from the lower end of each hook 22. During a preceding operation the fowl's vent has been cut out, so that the fowl has a cylindrical opening between its tail and its breast bone, and the fowl's skin is cut loose from its entrails.

A pressure chamber 24 connected to a compressed air source is formed within the hollow shaft 1. Above the upper support 4 a sleeve 25 is rotatably mounted on the shaft 1. The sleeve 25 also rotates with the driving wheel 14 and is provided with a number of openings, each connected with one of the cutting means 8 by means of a flexible line 26. As the sleeve rotates around the shaft 1 the openings of the sleeve are successively brought in alignment with the outlet port 27 of the pressure chamber 24, so that the corresponding knives are rotated.

During the operation of the apparatus shown in the FIGS. 1–3 a fowl 23, depending from one of the hooks 22, is brought to the apparatus by the conveyor. The hanger 16 carrying the hook 22 is received in one of the notches of the driving wheel 14 and the fowl's legs abut on an other guide rail 28. At this time the cam follower 12 of the slide block 7, corresponding with this particular notch of the driving wheel 14, is so positioned on the camming rail 13, that the slide block 7 is in its uppermost position on its guide means 6. As the driving wheel 14 rotates the cam follower 12 is displaced along the rail 13 in such manner that the slide block 7 is moved towards to fowl on its guide means 6. When the guide block nears the fowl the positioning means 11, comprising a ball shaped protrusion, is received in the opening made in the fowl by cutting out its vent. Thus the positioning means brings the fowl into the desired position relative to the cutting means 8. At the same time the cutting means is connected with the pressure chamber 24 via its flexible line 26, the corresponding opening of the sleeve 25 and the outlet port 27 of the pressure chamber 24, so that the knife 9 of the cutting means 8 is rotated. As the positioning means 11 penetrates into the fowl the now rotating knife 9 is pressed against the fowl's skin, so that the skin is severed. The opening of the housing 10 only exposes the knife 9 to such extent that only a cut of limited length and depth can be made in the fowl, so that the knife 9 is prevented from touching the fowl's entrails which lie at some distance beneath the fowl's shin. If for some reason the fowl's vent was not sufficiently cut out, the positioning means cannot penetrate into the fowl deep enough for the knife to reach the fowl's skin, so that the fowl's entrails, which in that case are still attached to the fowl's skin, cannot be damaged.

In certain cases it might be desirable to prevent the free lower end of the fowl 23 depending from the hook 22 from being pressed to far outwards by the positioning means 11 and/or the housing 10, which could result in a too deep cut and damage to the fowl's entrails. For this reason a counter pressure member may be provided comprising a horizontal pressure wheel 29, rotating in synchronisation with the driving wheel, which pushes the fowl inwardly towards the shaft 1 when the slide block moves down.

Figure 4:
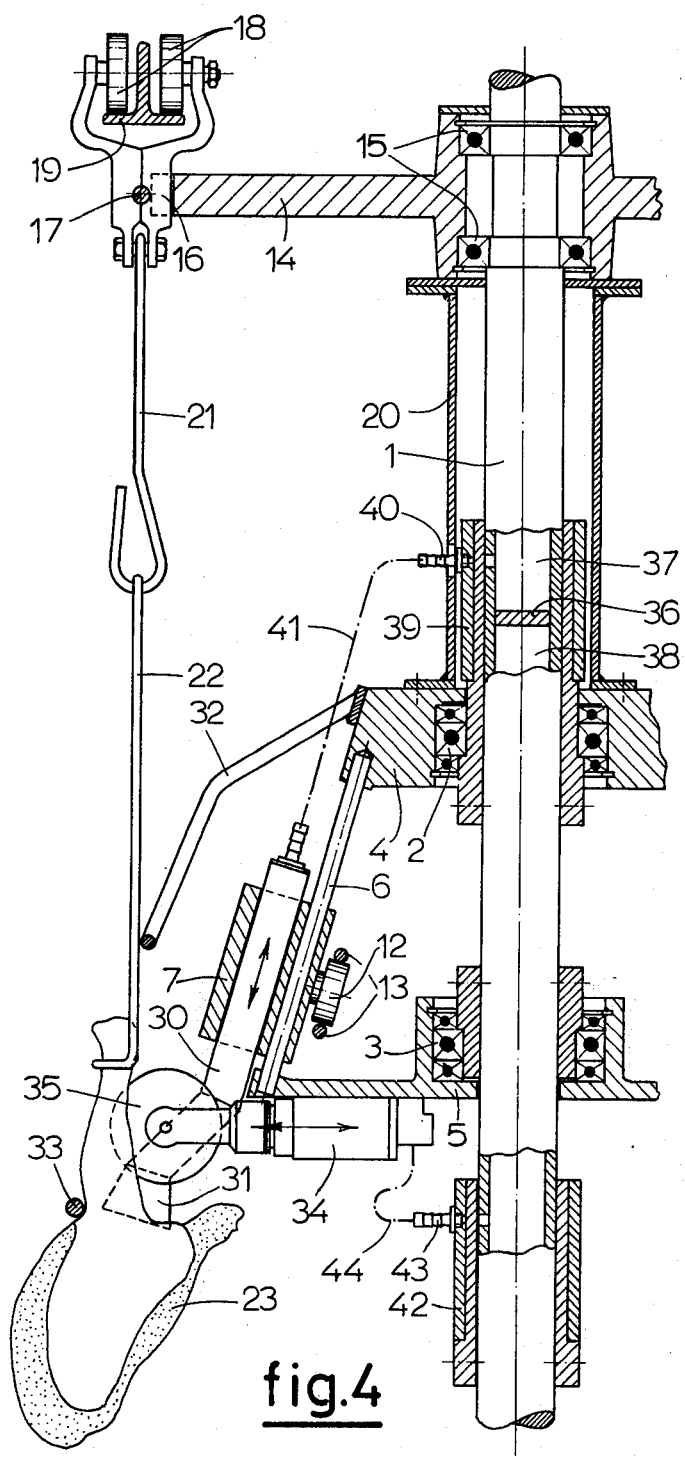
FIG. 4 is an axial cross section of another embodiment of the apparatus according to the invention.

FIG. 4 shows another embodiment of the apparatus according to the invention which is greatly similar to the apparatus shown in the FIGS. 1–3, so that the same parts are indicated with the same reference symbols. Thus the apparatus shown in FIG. 4 has a hollow central shaft 1 on which supports 4 and 5 with guide means 6 and slide blocks 7 are rotatably mounted. On the upper end of the shaft 1 a driving wheel 14 is mounted cooperating with the hangers 16 of a conveyor. Each slide bock has a cam follower 12 cooperating with a rail 13.

Each slide block 7, however, also carries a positioning means, comprising a suction pipe 30, the lower end of which is connected to a suction member 31. Beneath each guide means 6 a cutting means 34 is attached to the lower support 5, each cutting means comprising a pneumatically driven, rotating, circular knife 35.

The interior of the hollow shaft 1 is divided into a vacuum chamber 37 and a pressure chamber 38 by means of a transverse wall 36. The chamber 37 is connected with a vacuum source and the chamber 38 is connected with a pressured air source. Above the upper support 4 a first sleeve 39 is rotatably mounted on the shaft 1. The sleeve 39 rotates with the driving wheel 14 and is provided with a number of openings 40, each connected with one of the suction pipes 30 by means of a flexible line 41. As the driving wheel 14 rotates, the opening 40 are successively brought in alignment with the outlet port of the vacuum chamber 37. Beneath the lower support 5 a second sleeve 42 is rotatably mounted on the shaft 1. The sleeve 42, which also rotates with the driving wheel 14, is provided with openings 43, which are each connected to one of the knives 35. The openings 43 are permanently in communication with the pressure chamber 38, so that the knives are continually rotated.

During the operation of the apparatus shown in FIG. 4 a fowl 23 depending from one of the hooks 22 is brough to the apparatus by the conveyor. When the hanger 16 carrying the hook 22 is received in one of the notches of the driving wheel 14, the corresponding slide block 7 is in its uppermost position. As the driving wheel 14 is rotated by the hangers, the slide block 7 is moved towards the fowl by its cam follower 12 moving along the rail 13. When the slide block 7 nears the fowl, the suction member 31 is pressed against the fowl's skin near its vent. At that moment the suction member 31 is connected with the vacuum chamber 37 via the suction pipe 30, the line 41 and the corresponding opening 40 of the first sleeve 39, so that the fowl's skin is gripped by the suction member 31. Upon continued rotation of the driving wheel 14 the slide block 7 is moved back again towards the upper end of the guide means 6. During the movement of the slide block 7 the skin of the fowl is pulled along by the suction member 31 and brought into contact with the rotating knife 35, so that the skin is severed and the fowl's body cavity is opened. After the fowl's skin is cut the first sleeve 39 is rotated past the outlet port of the vacuum chamber 37 so that the suction member releases the skin of the fowl.

I claim:

1. In an installation for processing slaughtered poultry, including a conveyor, a plurality of hangers attached to said conveyor, and a plurality of hooks each adapted to be suspended on one of the said hangers and to carry a fowl by its ankle joints:

apparatus for opening the body cavity of a fowl of which the vent has been cut out and which is depending from one of the said hooks, comprising:

a driving wheel rotatable about a vertical axis and provided with circumferential notches successively engaged by the said hangers so that it rotates in synchronism with said conveyor, at least one inclined guide track coupled with said driving wheel so as to rotate together with the same, a guide block reciprocable along said guide track, a housing connected with said slide block, a circular knife rotatably mounted in said housing and partially exposed by the same, means for rotating said knife about an axis substantially extending in the direction of movement of said conveyor, a cam follower on said slide block, a cam rail engaged by said cam follower, whereby said slide block is displaced to bring said knife into engagement with the fowl, a positioning member attached to said housing, and a ball-shaped protrusion at the end of said positioning member adapted to be received in the opening made in the fowl by cutting out its vent so as to bring the fowl into the proper position with respect to said knife.

2. In an installation for processing slaughtered poultry, including a conveyor, a plurality of hangers attached to said conveyor, and a plurality of hooks each adapted to be suspended on one of the said hangers and to carry a fowl by its ankle joints;

apparatus for opening the body cavity of a fowl of which the vent has been cut out and which is depending from one of the said hooks, comprising:

a stationary vertical shaft, a driving wheel rotatably mounted on said shaft and provided with circumferential notches successively engaged by the said hangers so that it rotates in synchronism with said conveyor, a radially extending upper support rotatably mounted on said shaft and spaced with respect to said driving wheel, a coupling sleeve surrounding said shaft and connecting said driving wheel with said upper support, a radially extending lower support rotatably mounted on said shaft, spaced with respect to said upper support and having a larger diameter than said upper support, a plurality of inclined guide tracks interconnecting the edges of the said upper and lower supports, a plurality of slide blocks each reciprocable along one of the said guide tracks, and a stationary cam rail controlling the displacement of the said slide blocks, each of the said slide blocks being associated with:

a housing connected with said slide block, a circular knife rotatably mounted in said housing and partially exposed by the same, means for rotating said knife about an axis substantially extending in the direction of movement of said conveyor, a cam follower on said slide block engaging said cam rail whereby said slide block is displaced to bring said knife into engagement with the fowl, a positioning member attached to said housing, and a ball-shaped protrusion at the end of said positioning member adapted to be received in the opening made in the fowl by cutting out its vent so as to bring the fowl into the proper position with respect to said knife.

* * * * *